United States Patent Office 3,378,055
Patented Apr. 16, 1968

3,378,055
SPINNABLE COMPOSITION OF POLYAMIDES AND POLYESTERS PREPARED FROM A POLYAMIDE-POLYESTER DISPERSION AND A POLYAMIDE-POLYESTER REACTION PRODUCT
James J. Robertson, Akron, Ohio, assignor to The Firestone Tire & Rubber Company, Akron, Ohio, a corporation of Ohio
Filed Oct. 24, 1965, Ser. No. 504,986
30 Claims. (Cl. 152—359)

ABSTRACT OF THE DISCLOSURE

A tire cord having non-flat spotting properties may be prepared from a spinnable mixture of 25 to 65 parts polyester, and 75 to 35 parts of a polyamide forming a two-phase mixture, and 0.5 to 20 parts by weight per 100 parts of the mixture of the reaction product of a polyamide and polyester obtained by heating them together in the melt.

---

This invention relates, as indicated, to a novel composition of matter, and more particularly to a composition of matter having an improved spinning characteristic. Still more specifically, this invention relates to obtaining improvement in the melt spinning characteristics of a polyester dispersed in a polyamide by incorporating therein a minor amount of the reaction product of a polyester with a polyamide.

The compositions of this invention are characterized by valuable properties which render them especially useful as materials from which filaments or strands may be drawn or spun by conventional spinning apparatus, from which strands or cords may be fashioned which have particular utility in reinforcing rubber articles, especially ply stock for use in fabricating pneumatic tires.

The principal difficulty with nylon cord reinforced rubber articles has been in respect of the property of nylon to "cold flow" which, in the case of pneumatic tires results in a harmless, but undesirable situation known as "flat spot." This occurs when nylon cord reinforced pneumatic rubber tires in position on an automobile are allowed to stand for a considerable period of time. There results a "flat spot" on the tire in the area which has been in contact with the pavement. Until the tires have been driven for a short period of time after standing, the driver detects an undesirable thumping which soon disappears.

By incorporating polyesters, particularly a poly(alkylene terephthalate) in which the alkylene group contains from 2 to 4 carbon atoms, e.g. poly(ethylene terephthalate) as one phase and a polyamide particularly poly (amino acids) or poly(lactams), e.g. nylon - 6 [poly (epsilon - caprolactam)] and poly(enantholactam) as a separate phase the undesirable property of "cold flow" in the nylon is reduced to the point where "flat spot" in cord reinforced pneumatic rubber tires is virtually unnoticeable. Accordingly, rubber articles reinforced with filaments or cords formed from the compositions of the present invention exhibit greatly reduced "cold flow" properties.

One of the difficulties in producing strands or cords from these physical blends of polyesters dispersed in a continuous phase of a polyamide has been in their characteristics of spinning. These materials are spun through a conventional spinneret by extruding the blend under pressure at a temperature slightly above the melting point of the higher melting component thereof. When the blend is spun without inclusion of the additive in accordance with the principles of this invention difficulty in spinning is encountered.

The difficulties encountered include non-uniformity in diameter of the strand emerging from the spinneret, the variation being sufficient at times to so reduce the diameter that breakage of the strand occurs. Another difficulty is that the temperature range of spinning is quite limited.

It has been found that the spinning characteristics of a physical blend of a polyester and a polyamide may be improved by incorporating into the blend a minor amount of the reaction product of a polyester with a polyamide, and particularly a reaction product of the same polyester and the same polyamide that is used to form the blend. In general, from .5 to 20 parts of the reaction product per 100 parts of the blend will suffice to improve the spinning characteristics of the entire composition. Not only does the inclusion of the reaction product improve spinnable blends in respect of its spinning characteristics, but such inclusion renders spinnable blends which in the absence of such addition agents were either unspinnable or gave poor spun products. The range of concentration of the polyester in relation to the polyamide is expanded as well as the number and kind of polyesters and polyamides which may be successfully blended together to yield spinnable compositions.

To the accomplishment of the foregoing and related ends, said invention, then consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Briefly stated, the present invention is in a method of improving the spinning quality of a resinous dispersion of a polyester in a polyamide which comprises the steps of preparing a reaction product of a polyester having a melting point of at least 200° C. and a polyamide having a melting point of at least 175° C. The reaction product, as it will hereinafter be designated is included in a resinous blend formed from 25 to 65 parts by weight of a polyester having a melting point of at least 200° C. and having an intrinsic viscosity in the range of from 0.6 to 1.2 as one phase, and from 75 to 35 parts by weight of a polyamide in which the polymer unit contains from 6 to 21 carbon atoms and having a relative viscosity at 25° C. in concentrated $H_2SO_4$ (98%) of from 2.5 to 3.2 as the other phase. The resinous component in the higher concentration is usually the continuous phase of the dispersion and the component in lesser concentration the discontinuous phase. In general, the amount of reaction product added to the dispersion is in the range of from 0.5 to 20 parts by weight of the reaction product for each 100 parts by weight of the resinous dispersion. This invention is also in a spinnable composition as set forth above. All parts herein are by weight.

Figure 1:
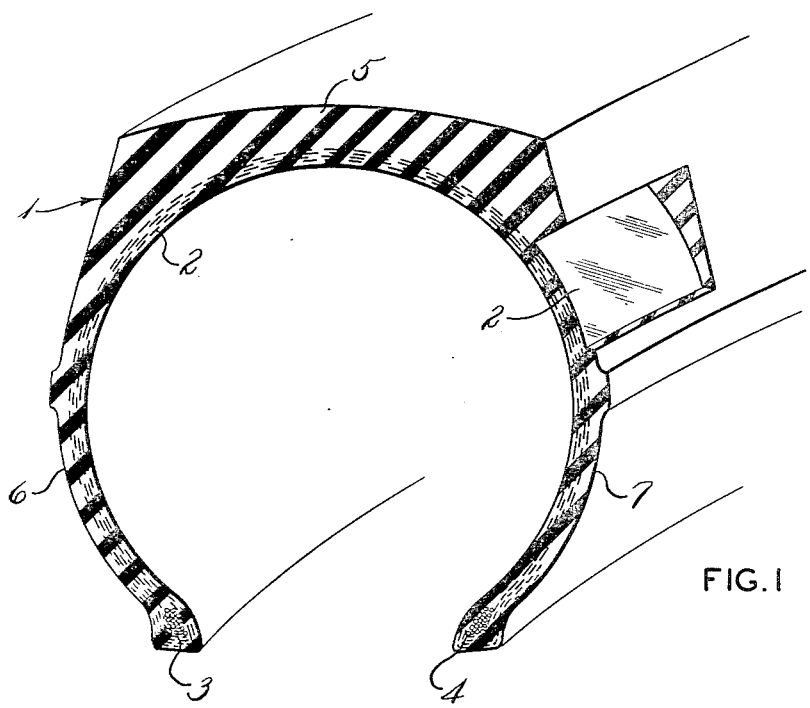
FIG. 1 is a cross-sectional view of a pneumatic rubber tire including plies having embedded therein reinforcing elements formed from the compositions of the present invention.

Referring now more particularly to FIG. 1 there is here shown in cross-section a pneumatic rubber tire generally indicated at 1, and composed of a rubberized fabric body portion 2 terminating at its edges in two inextensible bead portions 3 and 4. The rubbery tread 5 is superimposed and bonded, as by vulcanization, to cord reinforced portion 2. Rubbery side walls 6 and 7 extend from respective edges of the tread along the fabric body portion 2 to which they are bonded, respectively, to the bead portions 3 and 4.

Figure 2:
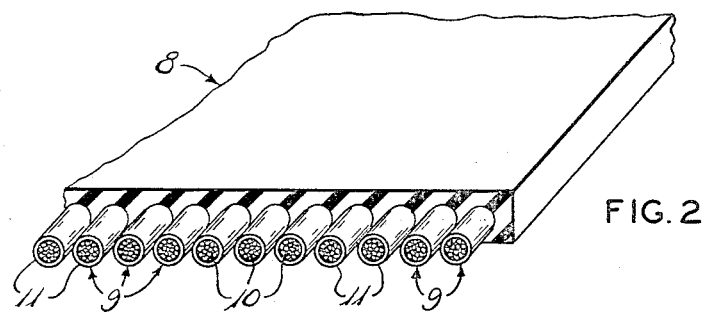
FIG. 2 is an enlarged, fragmentary perspective view in section, and somewhat diagrammatic, showing a portion of a ply including in oriented fashion, reinforcing elements formed from the composition of the present invention and having a coating of dip composition thereon.

FIG. 2 is a fragmentary, partially diagrammatic cross-sectional view in perspective showing a ply from which the body portion 2 of FIG. 1 may be formed and generally indicated at 8. Ply 8 is conveniently formed by calendering the desired rubber stock material onto and around the reinforcing elements 9. Reinforcing elements 9 as shown in FIG. 2 are composed of cords 10 of a formation, such as, those known as 840/3. This symbol indicates a cord formed from 3 strands of 840 denier yarn of the present invention twisted together. For use in reinforcing conventional 2-ply pneumatic passenger car tires, a cord having a denier of about 2520 is preferred. The cord denier may range from 1600 to 6000. Surrounding each of the cords 10 and diagrammatically illustrated, is a coating 11 which coating is formed on the cords 10 by dipping in a conventional nylon cord dipping composition followed by removal of excess dip composition and drying of the cord by conventional means. Such conditions of temperature as will promote the formation of an infusible, insoluble resin from the reactive resins constituents included in the dip composition may be used. It will be understood of course, that the cords 10 are well coated with the dip composition and that the resin-elastomer coating penetrates and becomes mechanically locked and adhered to the cord. In fabricating pneumatic rubber tires in accordance with this invention conventional procedures and apparatus are used.

The rubber stock reinforcing elements formed from the compositions of the present invention may be present in the form of single strands, a plurality of strands twisted together, or strands formed from a plurality of fibers in generally oriented condition and twisted with one or more other strands to form a cord. Also these reinforcing elements may be formed from a plurality of cords which in turn have been twisted together to form a composite cord material such as that which is shown in FIG. 3 of United States Patent No. 2,991,818. In certain instances, it may be desirable to include in the cords different fibrous materials, for example, different synthetic fibrous material and/or natural occurring fibrous materials. Among the natural occurring fibers which may be used in forming composite cords are cotton, hemp, wool, animal hair, silk, etc. Glass, asbestos, pure nylon, pure poly(ethylene terephthalate), steel wire, cellulose acetate, rayon, etc. are examples of additional synthetic fibers which may be used.

RESINOUS BLEND COMPONENTS

As indicated above, the resinous dispersions of the present invention are an intimate mixture of a polyester and a polyamide, which is a poly(amino acid) or a poly (lactam). The amount of the polyester varies from 25% to 65% by weight of the entire blend. This concentration is critical. Below a concentration of 25% of the polyester resin, the problem of "flat spot" or the inhibition of "cold flow" in the nylon is not observed to a degree which is satisfactory. Above 65% concentration of the polyester, no difficulties in spinning are encountered. Thus, the compositions of the present invention are rather precisely limited within the range of 25% to 65% by weight of the polyester dispersion in from 75% to 35% by weight of the polyamide.

To form spinnable resinous compositions in accordance with this invention, spinnable resinous components are employed. For the polyesters, particularly the poly(alkylene aryl dicarboxylates), those polymers which have average molecular weight of from 16,000 to 30,000 are spinnable. Stated in another way, these polyesters have an intrinsic viscosity in the range of 0.6 to 1.2. The preferred alkylene dicarboxylates contain from 2 to 12 carbons in the alkylene group and are alkylene aryl dicarboxylates. The alkylene groups may be branched chain or straight chain. These materials are commercially available, the most useful polyester being poly(ethylene terephthalate) having an intrinsic viscosity within the aforesaid range. Other useful poly(alkylene aryl dicarboxylates) having an average molecular weight in the above range and an intrinsic viscosity in the range of from 0.6 to 1.2 include poly(propylene terephthalate); poly(butylene terephthalate); poly(hexamethylene terephthalate); poly(octamethylene terephthalate); poly(decamethylene terephthalate); and poly(dodecamethylene terephthalate).

The polyester must have a melting point at least as high as 200° C. and more desirably higher than 200° C. e.g. up to 275° C. Melting points of at least 200° C. are required for use in tire cords, and for this use, the polyester is usually terephthalate. The aryl dicarboxylic acids are preferably symmetrical, particularly for use in tire fabrics, and they include for example, terephthalic acid, sym.-biphenyl dicarboxylic acid, diphenyl methane dicarboxylic acid (preferably the 4,4'-isomer); diphenyl-1,2-ethane dicarboxylic acid, the naphthoic and anthracene dicarboxylic acid, etc. The acids contains from 8–16 carbon atoms, or more.

The linear polyamide must have a melting point at least as high as 175° C. or 200° C., and preferably higher, as such, for example, 225 or 240 or 250 or 275° C. For fibers for use in tires, the melting point should be at least 200° C. Polyamides which may be used include those derived from dicarboxylic acids, such as, for example, succinic acid, glutaric acid, adipic acid, pimelic acid, suberic acid, azelaic acid, and sebacic acid; and from diamines containing, for example, 2 to 10 carbon atoms, such as ethylene diamine, tetramethylene diamine, hexamethylene diamine, octamethylene diamine, 1,4-di(methylamino) cyclohexane, as for example, nylon 66 or nylon 610, etc.; or the nylon may be derived from an omega-amino carboxylic acid such as omega-aminobutyric acid, omega-aminopimelic acid, omega-aminocaproic acid, etc., or the lactams thereof. Thus, the blend may be made utilizing nylons 4, 5, 6, 7, 8, and 11. The polyamide may be prepared from a lactam containing from 4 to 11 carbon atoms.

The polyamides desirably have molecular weights in the range of 16,000 to 30,000.

In a preferred embodiment the nylon component is a resinous polymer of epsilon-aminocaproic acid having an average molecular weight in the range of 18,000 to 27,000. This molecular weight range corresponds to a relative viscosity as determined in 98% sulphuric acid at 25° C. in the range of 2.5 to 3.2. This determination is made from a solution of 1 gram of the polymer in 100 ml. of the acid. Particularly suitable resinous compositions of this character are commercially available under the trade names nylon-6 and nylon-7.

Although the viscosity characteristics of each of these resins could be expressed in like terms, current trade practice is to identify the polyester resins in terms of their intrinsic viscosity, and the nylon resins in terms of their relative viscosity.

The production of a satisfactory blend of these resins involves a careful procedure. In the first place, it is desirable to prevent random interaction between the resin constituents of the blends of this invention. The compositions of the present invention are mixtures of resins formed under conditions to maintain two separate phases and to minimize insofar as is possible the interaction of one polymeric substance with the other. Although chemical interaction can be controlled by physical means, another means of minimizing such chemical interaction between the polymers is to utilize end-blocked polymers or partially end-blocked polymers. Both resins normally have terminal groups present in the reactants from which the resins are formed, e.g. —OH, —COOH, and NH$_2$. Blocking of the reactive ends by reactions with monofunctional alcohols, acids, amines, or the like will be helpful in minimizing undesired interaction.

In the case of the nylons, the commercial materials usually contain some end-blocking, the terminal groups being derived from butyl ammonium acetate, acetic acid, adipic acid, sebacic acid, or butyl amine.

REACTION PRODUCT COMPONENTS

The spinning characteristics of an intimate mixture, or blend, of the foregoing principal components are improved by the inclusion therein of a minor amount of a reaction product of a polyester and a polyamide. In either case, the reactive ends may be partially end-blocked. It becomes convenient at this point to identify more particularly the nature of the reaction products which are useful in this respect.

Various aromatic dicarboxylic acids may be used in producing the polyester reactant utilized in carrying out the invention, as will appear from what follows. The polyesters employed have the formula:

(1) $HO(CH_2)_a$—[O—CO—Aryl —CO—O$(CH_2)_b$—]$_x$OH

The polyester reactants preferred for use in this invention are obtained from terephthalic acid and have the formula:

(1-a) 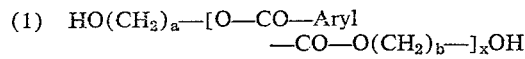

The polyamide reactant used in the process of this invention may be derived from a cyclic lactam or the reaction product of a dibasic acid and a diamine, and either the cyclic lactam or the reaction product may be reacted with an alkylene diamine to form a polyamide with greater than 50 percent amino and groups. The polyamide is selected from the class consisting of (2) A polylactam having the formula:

$H[HN(CH_2)_cCO—]_mOH$ (3) A reaction product of an aliphatic dibasic acid and an aliphatic diamine having the formula $HO[CO—(CH_2)_d—CO—NH—(CH_2)_eNH—]_yH$ or (4) A reaction product of either of the foregoing with an alkylene diamine, alkyl amine, aryl amine, carboxylic acids, alkyl or aryl, mono- or di-functional as represented by the formulae (5) $H[HN(CH_2)_cCO—]_m—NH(CH_2)_fX$, Y or Z and (6) $H_2N—(CH_2)_f—NH[CO—(CH_2)_d$ —CONH—$(CH_2)_e$—NH—]$_y$H In the foregoing formulae:

"Aryl" indicates a bivalent aromatic radical, which is preferably symmetrical.

$a$, $b$, $d$, $e$ and $f$ are each small numbers in the range of 2 to 10, and when occurring in any one formula they may be the same or different;

$c$ is 3 to 10;

$m$ is 10 to 500, and preferably 80 to 200 for tire cord;

$x$ is 10 to 250, and preferably 25 to 100 for tire cord;

$y$ is 10 to 300, and preferably 200 to 125 for tire cord.

The molecular weight of the reactants should desirably be in the fiber-forming range, i.e., at least about 10,000, although this is not critical since this constitutes only a relatively minor proportion of the over-all blend.

The polyester is derived from an aryl dicarboxylic acid, or the low carbon atom di-esters thereof. In the production of the polyester, the acid is reacted with a diol such as ethylene glycol, butane diol-1,4, propane diol-1,3, etc. The diol may comprise as many as 8 or more carbon atoms. The polyester must have a melting point at least as high as 200° C., and preferably it is higher, such as, for example, 225° C., or 250° C. or as high as 275° C. or more. A polyester with a melting point of at least 200° C. is required in fibers for tire cord, and usually it is a terephthalate. The aryl dicarboxylic acids are preferably symmetrical, although they are not necessarily so except for tire fabrics, and they include, for example, terephthalic acid, isophthalic acid, symmetrical biphenyl dicarboxylic acid, diphenyl methane dicarboxylic acid (preferably the 4,4'-isomer), diphenyl sulfone dicarboxylic acid (preferably the 4,4'-isomer), diphenyl-1, 2-ethane dicarboxylic acid, the naphthoic and anthracene dicarboxylic acids and mixtures of the foregoing. The acids contain from 8 to 16 or more carbon atoms. The polyesters include, for example, polyethylene terephthalate, polytetramethylene terephthalate, copolymers of ethylene glycol with terephthalic acids, etc.

The polyester and polyamide may desirably be reacted in 3:1 to 1:3 proportions although these proportions are not particularly critical.

In the preparation of the reaction products, any suitable melt blending equipment may be used. The conduct of the reaction under controlled conditions is very conveniently done in an extruder wherein the residence time is relatively long. The extent of reaction is determined by both the length of time and the temperature at which the reaction is carried out. Generally speaking 15 minutes at temperatures in excess of 560° F., e.g. 575° F. are adequate. However, as will be apparent to those skilled in the art longer times at lower temperatures or shorter times at higher temperatures will produce the same sort of product. The only requirement is that the reaction shall be carried out in the molten state for a period of time long enough to produce a significant amount of interaction. Quite obviously temperatures must be below the decomposition temperatures of the resins. Several techniques for measuring the extent of the reaction may be employed. For example, it is known that nylon-6 is soluble in a 60/40 cyclohexane/meta-cresol mixture, and that poly(ethylene terephthalate) is insoluble in this system. Therefore, treatment of the reaction product with this solvent mixture separates it particularly into components which are largely polyester (insoluble) and nylon-6 (soluble). In examining many such reaction products, it is apparent that the reaction causes solubilization of some of the polyester and insolubilization of some of the nylon. Thus, treatment of these reaction products with the 60/40 solvent mixture gives us a measure of the amount of reaction. This measurement should indicate a reaction of the polyester to the extent of at least 15% with the polyamide, and preferably about 25%.

The amount of additive required for treatment of the blend will depend both upon the extent of reaction and the composition of the total blend. It will be understood that the "additive" hereof is the total of the reaction product containing mass since no effort is made to isolate to reaction product per se. Generally speaking, compositions in the middle of the recited range, for example, from 35 to 50 parts of polyester will require more of and/or more completely reacted materials for satisfactory spinning. Of course, it is clear that reaction occurs between the polyamide and the polyester in the blend at a rate which is dependent again upon the time and temperature of the system. It is desired for the physical properties of such blends to be at optimum, that there be a minimum amount of such interaction in the bulk of the blend. The more free polyamide and free polyester possible in the blend, the better will be the spun product. The reaction product mass, in toto, is merely an addition change to permit the easy spinning of the blend of these two materials.

PREPARATION OF BLENDS

To produce the blends of the two resins, with the additive above described it has been found convenient to use a conventional screw type extruder. The materials are blended as rapidly as possible and at a temperature which is as low as possible but still above the melting point of both constituents. No added solvent is employed. The temperature of blending is difficult to pinpoint because with resins of different viscosities the melting points vary, and are rather ill defined at best. However, the temperature of blending is that minimum temperature above the melting point of the higher melting resin where there is obtained the desired dispersion in as short a period of time as possible. The extruder yields a strand like product which is then chopped into pellets or chips, dried and then spun through a spinneret of the type conventionally used for spinning nylon or poly(ethylene terephthalate) resins. Any mixing apparatus that yields good mixing at minimum residence time and minimum temperature may be used.

To prepare a satisfactory blend with a given polyamide material and a given polyester, there are several important considerations.

First, the materials to be blended must be thoroughly dry having a moisture content below about .05% by weight. Moisture contents in excess of this amount tend to degrade the polymers. It is preferred for best results that the moisture contents be below about 0.02%.

It has also been found that for satisfactory spinning the moisture content of the blend at the time of spinning should be below about 0.02%.

The next important consideration in spinning these blends is the dwell time, or residence time, during which the blend is in the molten state. Because as pointed out above, these resins are mutually reactive, conditions favoring interaction of the polymers should be maintained for the shortest possible period of time. The rate of interaction is a function of time and temperature. To the achievement of the end of minimizing interaction antioxidants, chain stoppers and copper stabilizers may be incorporated with the blend. A convenient temperature range in which to effect the blending is from 480° F. to 540° F. A commercially available nylon-6, poly (epsilon-caprolactam), has a melting point in the range of 419° F. to 428° F. and is normally spun at a temperature of 475° F.–540° F. A suitable commercially available poly(ethylene terephthalate) has a melting point in the range of 464° F. to 540° F. For purposes of spinning, the temperature of the lower melting point component in the blend determines the spinning temperature, thus, in a 30/70 blend of the resins above-mentioned, the spinning temperature would be that of the nylon-6, i.e. 475° F.–540° F.

Generally speaking in respect of spinning, conventional spinning techniques are applicable to the compositions of the present invention and thus conditions which are based on spinning either of the components alone are the conditions which may be used for spinning the blend of the components.

For spinning purposes, the moisture content of the blend is desirably less than 0.02%, and preferably less than 0.01% by weight. After the product has been blended, and the resulting strand-like product chopped into pellets and the pellets are dried by any suitable means such as vacuum drying at 176° F. to 260° F. Dry hot nitrogen gas may be passed over the pelletized product. The product is capable of picking up moisture on exposure to the atmosphere and in two hours time at room temperature the moisture content may increase from a minimum of .01% to 0.1%.

It becomes convenient at this point to further illustrate the invention by giving specific examples of compositions and methods of forming such compositions, it being understood that these examples are for illustrative purposes only and pursuant to the teachings of which those skilled in the art will be able to devise and blend additional examples of the two resin components used in forming these blends.

PREPARATION OF A POLYAMIDE

Poly(epsilon-caprolactam) was prepared by reacting 100 parts of caprolactam and 1.20 parts of 50 percent aqueous hexamethylene diamine for 16 hours at 256° C. in a closed container. The resultant polymers are ground in a Wiley mill, washed with deionized water for 16 hours at 70° C. and dried for 16 hours at 80° C. in a vacuum dryer. The total polymer yield was 90 percent. The relative viscosity of the nylon as determined on a one percent solution by volume in concentrated sulphuric acid was 2.01, indicating a molecular weight of approximately 12,500.

PREPARATION OF A POLYESTER

A polyester was prepared by reacting 194 parts dimethyl terephthalate, 124 parts ethylene glycol, 0.06 part antimony trioxide and 0.10 part manganese acetate. The reaction was carried out in a three-neck flask fitted with a mechanical stirrer, a nitrogen inlet tube and a take-off condenser. The reaction was heated by means of a Glascol heating mantle to 156° C. at which time the methanol which was formed began to distill. The reaction temperature was raised to 249° C. over a period of three hours, all methanol having been removed at this time. A vacuum of 1–2 mm. was slowly applied with the temperature rising to a maximum of 280° C. The reaction was continued for 5 hours under a vacuum of 1–2 mm. to give a polyester with an intrinsic viscosity of 0.70 as measured at 25° C. in a 50/50 solution of phenol and tetrachloroethane.

PREPARATON OF REACTION PRODUCT

As a representative general example, 70 parts by weight of a poly(epsilon-caprolactam), e.g. nylon–6, having a relative viscosity of from 2.0 to 3.0, e.g. 2.7 and 30 parts by weight of poly(ethylene terephthalate), having an intrinsic viscosity of from 0.3 to 1.2, e.g., 0.7 where blended by passing the dry chips through a 1 inch extruder at a rate of 10 pounds per hour and at a temperature of 550° F. The resultant polymer strands were cut into chips with any suitable strand cutter and dried under a vacuum of less than 0.5 mm. at 180° F. to 250° F., e.g. 200° F.

The blend chips were fed to a 1.5 inch extruder equipped with a spin head and a spin pump. The stock temperature was 565° F. and the reaction time at this temperature was 30 minutes. The reaction product mass was extruded into flat cakes which on cooling formed a solid mass. This reaction product mass was then broken into pieces and ground in a suitable grinder or mill to a mesh size of 20 or finer. The mesh size is not critical, merely convenient. This material is then ready for use as an addition agent in forming a spinnable blend of a polyamide with a polyester as above described.

Further examples are listed in Table I. It should be understood that the preparation of the reaction product is by no means limited to the particular equipment in which it is formed or which is used in treating it.

Preparation of reaction products of the two resin types, is a function of time and temperature. For example, contacting poly(epsilon caprolactam) (nylon 6) and poly (ethylene terephthalate) in the melt state of a temperature of about 480° C. will produce the same result in a longer period of time as heating at 510° F. or 520° F. or 555° F. for correspondingly shorter time.

The extraction technique for determination of cyclohexane/m-cresol solubles is as follows:

Weigh 2.00±0.05 g. of the reaction product and dissolve overnite, with stirring, in 200 mls. of a 75/25 cyclohexane/m-cresol solution. A practical grade of m-cresol with distillation, or reagent grade without distillation may be used. Centrifuge until the top layer is absolutely clear. Remove the top layer by means of vacuum decantation. This layer will contain polyamide plus some polyester, and should be saved for evaluation or for combination with subsequent layers.

Another 200 mls. of a 60/40 solution of cyclohexane/m-cresol is added to the residue, stirred at least 4 hours and centrifuged until the top layer is absolutely clear. Remove the top layer by means of vacuum decantation. This layer will contain a very small amount of polyamide and polyester, and should be saved for evaluation or for combination with the previous layer.

A last extraction with a 60/40 solution of cyclohexane/m-cresol is carried out as described above. The top layer should be separated as cleanly as possible from the residue. The top layer may be discarded or combined as desired.

The residue is washed in several volumes of ethyl ether, filtered and washed several times (at least 10) with ethyl ether and dried in an oven at 70° C. Filtration utilizing a tared fritted disc funnel is desirable. The exact weight of the filtrate is determined to two decimal places.

Intrinsic viscosity of poly(alkylene aryl dicarboxylate) was determined as a .5% solution by volume in 50:50 phenol:tetrachloroethane solution.

Relative viscosities of the polyamide where stated herein were determined as a 1% by volume solution in concentrated sulphuric acid.

TABLE I.—PREPARATION OF REACTION PRODUCT

| | A | B | C | D | E |
|---|---|---|---|---|---|
| Percent poly(epsilon-caprolactam) | 70 | 70 | 70 | 50 | 70 |
| Percent polyethylene terephthalate | 30 | 30 | 30 | 50 | 30 |
| Polyamide, rel. visc | 2.8 | 2.8 | 2.8 | 2.95 | 2.85 |
| Polyethylene terephthalate, int. visc | 0.7 | 0.7 | 0.7 | 0.83 | 0.70 |
| Extruder preparation: | | | | | |
| Stock temp., °F | 565 | 565 | 580 | 580 | 575 |
| Reaction time, min | 15 | 30 | 15 | 15 | 15 |
| Reaction Product, int. visc | 0.81 | 0.58 | 0.52 | 0.54 | 0.50 |
| Percent insoluble in 60/40 cyclohexane/m-cresol | 20.6 | 15.9 | 16.1 | 37.0 | 15.3 |
| Percent polyamide in insoluble fraction | 2.35 | 9.12 | 9.4 | 4.83 | 8.60 |

PREPARATION OF BLENDS

The following examples illustrate preparation of blends of the polyamide with the polyester, with and without addition of a copolymer of the type illustrated above. It will be understood by those skilled in the art that these examples are merely illustrative and that from these numerous other examples will become readily apparent.

Example 1

Poly(epsilon caprolactam), 65 parts, relative viscosity=2.75 and poly(ethylene terephthalate), 35 parts, intrinsic viscosity=0.7, were blended by passing through a one inch National Rubber Machinery (NRM) Company extruder. This blend was thoroughly dried and spun at a spinning temperature of 520° F. by conventional techniques into 4800/90 yarn. The uniformity as determined from the 5 largest and 5 smallest filaments was 7.18, a uniformity below 2.0 is desirable.

The yarn could not be drawn by conventional techniques without undergoing a large number of filament breaks.

Example 2

Poly(epsilon-caprolactam), 65 parts, relative viscosity=2.75 and poly(ethylene terephthalate), 35 parts, intrinsic viscosity=0.70, and 10 parts reaction product A, Table 1 were blended in a one inch NRM extruder. The blend was thoroughly dried and spun at stock temperatures of 500° F.–515° F. by conventional techniques into 4360/90 yarn. The uniformity average of the five largest and five smallest filaments is 3.1–3.2.

The yarn could be drawn by conventional techniques but broken filaments were still a problem.

Example 3

Poly(epsilon-caprolactam), 65 parts, relative viscosity=2.75 and poly(ethylene terephthalate), 35 parts, intrinsic viscosity=0.70, and 10 parts reaction product B, Table 1 were blended in a one inch NRM extruder. The blend was thoroughly dried and spun at spinning temperatures of 510° F.–550° F. by conventional techniques into 4360/90 yarn. The uniformity average of the five largest and five smallest filaments was below 2.0 and in most cases below 1.5.

The yarn could be readily drawn by conventional techniques to give tenacities of greater than 8.0 grams/denier with no broken filaments.

Example 4

Poly(epsilon-caprolactam), 60 parts, relative viscosity=2.75, and poly(ethylene terephthalate), 40 parts, intrinsic viscosity=0.70 were blended in a one inch NRM extruder. The blend was thoroughly dried and spun at stock temperature of 470° F.–550° F. by conventional techniques into 4360/90 yarn. Yarn could not be collected at spinning temperatures above 480° F. At spinning temperatures of 470° F.–480° F. the yarn could not be drawn to a tenacity of greater than 4.0 gram/denier without a multiplicity of broken filaments.

Example 5

Poly(epsilon-caprolactam), 60 parts, relative viscosity=2.75, poly(ethylene terephthalate), 40 parts, intrinsic viscosity=0.70, and reaction product B, Table 1, 10 parts, were blended in a one inch NRM extruder. The blend was thoroughly dried and spun by conventional techniques into 4360/90 yarn. The polymer spun well over a range of spinning temperatures, 470° F.–550° F. Uniformities were 1.3 to 2.0 and the yarn obtained at stock temperatures of 510° F.–550° F. could be readily drawn with tenacities of greater than 8.0 grams/denier.

Example 6

Poly(epsilon-caprolactam), 60 parts, relative viscosity=2.75, poly(ethylene terephthalate), 40 parts, intrinsic viscosity=0.83, and reaction product D, Table 1, were blended in a one inch NRM extruder. The polymer blend was thoroughly dried and spun by conventional techniques in 4360/90 yarn. Uniformities were between 1.5–2.0 over a range of spinning temperatures, 510° F–550° F., with excellent drawability. Tenacities of 8.0 grams/denier and above were obtained.

Example 7

Poly(epsilon-caprolactam), 60 parts, relative viscosity=2.75, poly(ethylene terephthalate), 40 parts, intrinsic viscosity=0.78, and reaction product C, Table 1, 5 parts were blended in a one inch NRM extruder. The polymer blend was thoroughly dried and spun by conventional techniques into 4360/90 yarn. Unformity at a spinning temperature of 520° F. was below 2.0 and the tenacity was 7.0–8.0 grams/denier.

Example 8

Poly(epsilon-caprolactam), 50 parts, relative viscosity=2.75, poly(ethylene terephthalate), 50 parts, intrinsic viscosity=0.76, were blended in a one inch NRM extruder. The polymer blend was thoroughly dried and an attempt was made to spin 4360/90 yarn. At spinning temperatures of 500° F.–550° F. no yarn with a uniformity of less than 10.0 could be collected.

Example 9

Poly(epsilon-caprolactam), 50 parts, relative viscosity=2.75, poly(ethylene terephthalate), 50 parts, intrinsic viscosity=0.76, and reaction product E, Table 1, 10 parts were blended in a one inch NRM extruder. The polymer blend was thoroughly dried and spun as 3450/90 yarn. The uniformity at a spinning temperature of 520° F. was 1.4 to 1.5. The yarn drew well and had a tenacity between 7.5–8.5 grams/denier.

As indicated above, many devices for expanding residence life of the resins at temperatures above their respective melting points may be employed, such as, the use of reaction inhibitors, e.g. antioxidants, and certain copper compounds, which tend to prevent or inhibit interaction of the resins. Work must be done upon the blend in order to achieve a satisfactory degree of intimate admixture of the phases and the time of exposure to the blending operation is determined by the efficiency of the machine in achieving a dispersion and the resistance of the blend to interaction in which the disperse phase has a particle size as visibly determined with the aid of a phase microscope.

If a pre-blending operation is used, the resin blend is normally cooled to normal temperatures, e.g. room temperature, where it appears to be stable indefinitely. Even at the temperatures at which tires are normally operated there is no apparent deterioration of the resin blend. Likewise, after spinning, the resulting filaments exiting from the spinneret are quenched and then drawn in order to orient and develop maximum properties.

TABLE II.—ADDITIONAL ILLUSTRATIVE EXAMPLES OF BLEND COMPONENTS

Polyesters:
(1) Poly(propylene terephthalate)
(2) Poly(tetramethylene terephthalate)
(3) Poly(hexamethylene terephthalate)
(4) Poly(octamethylene terephthalate)
(5) Poly(decamethylene terephthalate)
(6) Poly(dodecamethylene terephthalate)
(7) Poly(ethylene biphenyl dicarboxylate)
(8) Poly(trimethylene biphenyl-4,4′-dicarboxylate)
(9) Poly(ethylene diphenyl-1,2-ethane dicarboxylate)
(10) Poly(ethylene terephthalate)
(11) A polyester from dimethylol cyclohexane and terephthalic acid Polyamides:
(12) Poly(hexamethylene adipamide)
(13) Poly(enantholactam)
(14) Poly(omega-aminobutyric acid)
(15) Poly(omega-aminopimelic acid)
(16) Poly(omega-aminocaprylic acid)
(17) Poly(omega-aminoundecylenic acid)

TABLE III.—ADDITIONAL ILLUSTRATIVE EXAMPLES OF REACTION PRODUCT

| Example No. | Polyester Component | | Polyamide Component | |
|---|---|---|---|---|
| | Parts by Wt. | Table II No. | Parts by Wt. | Table II No. |
| (18) | 30 | (1) | 70 | (12) |
| (19) | 30 | (1) | 70 | (13) |
| (20) | 30 | (2) | 70 | (12) |
| (21) | 30 | (2) | 70 | (13) |
| (22) | 30 | (3) | 70 | (12) |
| (23) | 30 | (3) | 70 | (13) |
| (24) | 30 | (4) | 70 | (12) |
| (25) | 30 | (4) | 70 | (13) |
| (26) | 30 | (5) | 70 | (12) |
| (27) | 30 | (5) | 70 | (13) |
| (28) | 30 | (6) | 70 | (12) |
| (29) | 30 | (6) | 70 | (13) |
| (30) | 30 | (7) | 70 | (12) |
| (31) | 30 | (7) | 70 | (13) |
| (32) | 30 | (8) | 70 | (12) |
| (33) | 30 | (8) | 70 | (13) |
| (34) | 30 | (9) | 70 | (12) |
| (35) | 30 | (10) | 70 | (12) |
| (36) | 40 | (10) | 60 | (12) |
| (37) | 50 | (10) | 50 | (12) |
| (38) | 25 | (10) | 75 | (13) |
| (39) | 30 | (10) | 70 | (13) |
| (40) | 35 | (10) | 65 | (13) |
| (41) | 40 | (10) | 60 | (13) |
| (42) | 50 | (10) | 50 | (13) |
| (43) | 30 | (11) | 70 | (12) |
| (44) | 50 | (11) | 50 | (12) |
| (45) | 35 | (11) | 65 | (13) |
| (46) | 50 | (11) | 50 | (13) |
| (47) | 30 | (10) | 70 | (14) |
| (48) | 30 | (10) | 70 | (15) |
| (49) | 30 | (10) | 70 | (16) |
| (50) | 30 | (10) | 70 | (17) |
| (51) | 30 | (11) | 70 | (14) |
| (52) | 30 | (11) | 70 | (16) |

TABLE IV.—ADDITIONAL ILLUSTRATIVE EXAMPLES OF BLENDS INCLUDING REACTION PRODUCT ADDITIVES

| Example No. | Polyester Component | | Polyamide Component | | Additive | |
|---|---|---|---|---|---|---|
| | Parts by Wt. | Table II No. | Parts by Wt. | Table II No. | Parts by Wt. | Table III No. |
| (1) | 75 | (13) | 25 | (10) | 5 | (38) |
| (2) | 75 | (13) | 25 | (10) | 5 | (39) |
| (3) | 70 | (13) | 30 | (10) | 5 | (39) |
| (4) | 70 | (13) | 30 | (10) | 10 | (39) |
| (5) | 65 | (13) | 35 | (10) | 10 | (39) |
| (6) | 65 | (13) | 35 | (10) | 10 | (40) |
| (7) | 60 | (13) | 40 | (10) | 10 | (41) |
| (8) | 50 | (13) | 50 | (10) | 10 | (42) |
| (9) | 40 | (13) | 60 | (10) | 10 | (42) |
| (10) | 75 | (12) | 25 | (10) | 10 | (35) |
| (11) | 70 | (12) | 30 | (10) | 10 | (35) |
| (12) | 65 | (12) | 35 | (10) | 10 | (35) |
| (13) | 60 | (12) | 40 | (10) | 10 | (36) |
| (14) | 50 | (12) | 50 | (10) | 10 | (37) |
| (15) | 70 | (14) | 30 | (10) | 10 | (47) |
| (16) | 70 | (14) | 30 | (10) | 10 | (39) |
| (17) | 70 | (16) | 30 | (10) | 10 | (49) |
| (18) | 70 | (16) | 30 | (10) | 10 | (39) |
| (19) | 70 | (16) | 30 | (10) | 10 | (35) |
| (20) | 70 | (17) | 30 | (10) | 10 | (50) |
| (21) | 70 | (12) | 30 | (1) | 10 | (18) |
| (22) | 70 | (13) | 30 | (1) | 10 | (19) |
| (23) | 70 | (12) | 30 | (2) | 10 | (20) |
| (24) | 70 | (13) | 30 | (2) | 10 | (21) |
| (25) | 70 | (12) | 30 | (3) | 10 | (22) |
| (26) | 70 | (13) | 30 | (3) | 10 | (23) |
| (27) | 70 | (12) | 30 | (4) | 10 | (24) |
| (28) | 70 | (13) | 30 | (4) | 10 | (25) |
| (29) | 70 | (12) | 30 | (5) | 10 | (26) |
| (30) | 70 | (13) | 30 | (5) | 10 | (27) |
| (31) | 70 | (12) | 30 | (6) | 10 | (28) |
| (32) | 70 | (13) | 30 | (6) | 10 | (29) |
| (33) | 70 | (12) | 30 | (7) | 10 | (30) |
| (34) | 70 | (13) | 30 | (7) | 10 | (31) |
| (35) | 70 | (12) | 30 | (8) | 10 | (32) |
| (36) | 70 | (13) | 30 | (8) | 10 | (33) |
| (37) | 70 | (12) | 30 | (9) | 10 | (34) |
| (38) | 70 | (13) | 30 | (9) | 10 | (35) |
| (39) | 70 | (13) | 30 | (10) | 10 | (35) |
| (40) | 70 | (12) | 30 | (10) | 10 | (39) |
| (41) | 70 | (13) | 30 | (10) | 10 | (40) |

Generally speaking, the incorporating of polyamide/polyester reaction products (i.e. having intrinsic viscosities in the range of from about 0.2 to 0.8) has enabled the spinning of blends of polyesters and polyamides wherein the concentration of the polyester is substantially higher than heretofore permissible in a spinnable blend. For example, concentrations of the polyester above 25 parts per 100 parts of blend, e.g. 35, 40, and as high as 65 parts of polyester per 100 parts of blend have been rendered spinnable by the inclusion of the reaction products hereof. The spins have good uniformity over a broad temperature range of spinning, yielding yarns having optimum tenacities above 8.0 grams per denier.

Usually the polyester and the polyamide resins are blended to form the dispersion in the presence of the additive. The blending and additive inclusion may be done in the spinning apparatus or in a separate piece of equipment, e.g. an extruder, prior to introduction into the spinning apparatus. Sufficient blending is achieved in a single or dual screw extruder to give particle sizes of the disperse polyester phase less than 5 microns and preferably in the range of 2 to 3 microns.

The resinous components of the blends desirably have molecular weights, as indicated by the intrinsic viscosity, of a broader range than the molecular weights of the reaction products. Higher average molecular weights for the individual resinous components of the blend are desirably employed. When a lower average molecular weight reaction product, i.e. one having a lower intrinsic viscosity is employed, it has been found that smaller amounts, that is in the lower end of the range of concentration of the reaction product in the blend may be used to give superior spin results. Higher molecular weight reaction products require concentrations approaching the upper end of the range of concentration in the blend. When using a 1.5 inch extruder in the preparation of the block copolymers, longer residence times and higher stock temperatures have produced lower molecular weight reaction products.

The addition of the lower average molecular weight reaction products at the 5 to 10 parts per 100 parts of blend level appears to reduce the viscosity stability of blends made by means of an extruder. While the high molecular weight reaction products do not substantially improve the spin characteristics of extruder produced resinous blends in the lower concentration range i.e. 5 to 10 parts per 100 parts of blend, larger quantities do improve the spin characteristics of extruder produced blends. By means of the principles of the present invention, compositions, i.e. those blends which contain more than 30 parts of polyester and which are difficultly spinnable in the absence of the additive reaction products, can be rendered spinnable to concentrations of polyester as high as 65 parts per 100 parts of blend. Useful blends extend to as low as 25 parts of polyester per 100 parts of blend.

With respect to the degree of reaction, this is a function of the temperature and the hold-up time, or residence time, in the extruder. For example, using a mixture of 70 parts of poly(epsilon-caprolactam), relative viscosity 2.78, and 30 parts of poly(ethylene terephthalate), intrinsic viscosity .78, at 565° F. in a 1.5 inch extruder, it was necessary to hold-up the reactant materials for approximately 29 minutes. With the same materials at the same concentration, in the same apparatus, at a temperature of 580° F., 14 minutes was adequate. The hold-up time in the extruder is adjusted by means of a pump which empties the extruder head which is in turn fed by the extruder.

An advantage of the inclusion of the reaction products of this invention in the resinous blends is that the spinning temperature range is broadened while maintaining good filament uniformity. High draw ratios with tenacities of between about 4 and about 9 grams per denier have been obtained.

It has also been found that with blends containing 40 parts of the polyester per 100 parts of resinous blend, and about 10 parts of a polyamide/polyester reaction product having a different ratio by weight of the polyester to the polyamide, e.g. 1:1, and about .5 part per 100 parts of resinous blend of a suitable lubricant wax either natural or synthetic, e.g. Acrawax C, a synthetic wax, M.P. 137° C.–139° C., sp. gr. 0.975 spun well over a good temperature range, drew well and gave high tenacity. The polyamide viscosity did not decrease as much on spinning as it did when a lower concentration of polyester in the copolymer was used. Thus, it is desirable for preserving the stability of the polyamide to increase the proportion of polyester in the copolymer, for example, to formulate the reaction product from a 30/70 or a 20/80 polyamide/polyester blend.

While for most purposes it is desirable and convenient that the polymeric components from which the reaction product is made should be the same as the polymeric components from which the blend is made insofar as chemical nature is concerned, it should be understood that it is contemplated in accordance herewith, that the polyester of the reaction product may be different from the polyester of the blend in chemical nature, and that the polyamide of the reaction product may be different from the polyamide of the blend in chemical nature, without departing from the invention hereof. Also, where the polyesters of the reaction product and the blend may be the same chemically, the polyamide of the reaction product and the blend, respectively, may be different chemically. Also, where the polyamides of the reaction product and the blend may be the same chemically, the polyester of the reaction product and the blend, respectively, may be different chemically. Such variations may be made without departing from the invention hereof.

Other modes of applying the principle of this invention may be employed instead of those specifically set forth above changes being made as regards the details herein disclosed, provided the elements set forth in any of the following claims, or the equivalent of such be employed.

It is, therefore, particularly pointed out and distinctly claimed as the invention:

1. A spinnable resinous mixture including as one phase from 25 to 65 parts by weight of a poly(alkylene aryl dicarboxylate) having an intrinsic viscosity in the range of from 0.6 to 1.2, and, as the other phase, from 75 to 35 parts by weight of a polyamide in which the polymer unit contains from 6 to 21 carbon atoms, and having a relative viscosity as determined at 25° C. in concentrated $H_2SO_4$ (98%) of from 2.5 to 3.2, the summation of the weights of the two phases totalling 100 parts, and from .5 to 20 parts by weight per 100 parts of said mixture of the reaction product of a poly(alkylene aryl dicarboxylate) having a melting point of at least 200° C., and a polyamide having a melting point of at least 175° C., said reaction product having an intrinsic viscosity of from .2 to .8, and in which at least 15% by weight of the poly(alkylene aryl dicarboxylate) has been reacted with said polyamide.

2. A spinnable resinous composition consisting essentially of an intimate mixture of from 25 parts to 65 parts by weight of a poly(alkylene aryl dicarboxylate) having an average molecular weight in the range of from 16,000 to 30,000 as one phase, and, as the other phase, from 75 parts to 35 parts by weight of a polyamide in which the polymer unit contains from 6 to 21 carbon atoms and having an average molecular weight in the range of from 18,000 to 27,000, the summation of the weights of the two phases totalling 100 parts, and from 0.5 part to 20 parts by weight per 100 parts of mixture, of the reaction product of a poly(alkylene aryl dicarboxylate) having a melting point of at least 200° C. and a polyamide having a melting point of at least 175° C., said reaction product having an intrinsic viscosity of from 0.2 to 0.8, and in which at least 15% by weight of the poly(alkylene aryl dicarboxylate) has been reacted with said polyamide.

3. A spinnable resinous composition in accordance with claim 2 in which the poly(alkylene aryl dicarboxylate) is a poly(alkylene terephthalate) in which the alkylene substituent group contains from 2 to 12 carbon atoms.

4. A spinnable resinous composition in accordance with claim 2 in which the poly(alkylene aryl dicarboxylate) is a poly(ethylene terephthalate).

5. A spinnable resinous composition in accordance with claim 2 in which the polyamide is poly(hexamethylene adipamide).

6. A spinnable resinous composition in accordance with claim 2 in which the polyamide is a poly(epsilon-caprolactam).

7. A textile filament consisting essentially of an intimate mixture of from 25 parts to 65 parts by weight of a poly(alkylene aryl dicarboxylate) having an intrinsic viscosity in the range of from 0.6 to 1.2 as one phase in from 75 parts to 35 parts by weight of a polyamide in which the polymer unit contains from 6 to 21 carbon atoms, and having a relative viscosity as determined at 25° C. in concentrated $H_2SO_4$ (98%) of from 2.5 to 3.2 as the other phase, and containing intimately dispersed therein from 0.5 to 20 parts by weight per 100 parts of mixture of the reaction product of a poly(alkylene aryl dicarboxylate) having a melting point of at least 200° C., and a polyamide having a melting point of at least 175° C., said reaction product having an intrinsic viscosity of from 0.2 to 0.8, and in which at least 15% by weight of the poly(alkylene aryl dicarboxylate) has been reacted with said polyamide.

8. A textile filament in accordance with claim 7 in which the poly(alkylene aryl dicarboxylate) in the mixture is a poly(ethylene terephthalate), and the polyamide in the mixture is a poly(epsilon-caprolactam).

9. A textile filament in accordance with claim 7 in which the poly(alkylene aryl dicarboxylate) in both the mixture and the reaction product is a poly(ethylene terephthalate).

10. A textile filament in accordance with claim 7 in which the polyamide in both the mixture and the reaction product is a poly(epsilon-caprolactam).

11. A textile filament in accordance with claim 7 in which the poly(alkylene aryl dicarboxylate) in both the mixture and the reaction product is a poly(ethylene terephthalate), and the polyamide in both the mixture and the reaction product is a poly(epsilon-caprolactam).

12. A cord material formed from a plurality of filaments in accordance with claim 7.

13. A pneumatic tire comprising a rubber tread portion over-lying and bonded to a rubber body portion including reinforcing elements embedded therein and a pair of integral rubber side wall portions extending from said body portion and each terminating in an inextensible bead portion, said reinforcing elements including spun strands consisting essentially of an intimate mixture of from 25 to 65 parts by weight of a poly(alkylene aryl dicarboxylate) having an intrinsic viscosity of from 0.6 to 1.2 as one phase, in from 75 to 35 parts by weight of a polyamide in which the polymer unit contains from 6 to 21 carbon atoms, and having a relative viscosity as determined at 25° C. in concentrated $H_2SO_4$ (98%) of from 2.5 to 3.2 as the other phase, and having intimately admixed therewith from 0.5 to 20 parts by weight per 100 parts of mixture of the reaction product of a poly(alkylene aryl dicarboxylate) having a melting point of at least 200° C., and a polyamide having a melting point of at least 175° C., said reaction product having an intrinsic viscosity of from 0.2 to 0.8, and in which at least 15% by weight of the poly(alkylene aryl dicarboxylate) has been reacted with said polyamide.

14. A pneumatic tire in accordance with claim 13 in which the poly(alkylene aryl dicarboxylate) in the mixture is a poly(ethylene terephthalate), and the polyamide in the mixture is a poly(epsilon-caprolactam).

15. A pneumatic tire in accordance with claim 13 in which the poly(alkylene aryl dicarboxylate) in both the mixture and the reaction product is a poly(ethylene terephthalate).

16. A pneumatic tire in accordance with claim 13 in which the polyamide in both the mixture and the reaction product is a poly(epsilon-caprolactam).

17. A pneumatic tire in accordance with claim 13 in which the poly(alkylene aryl dicarboxylate) in both the mixture and the reaction product is a poly(ethylene terephthalate) and the polyamide in both the mixture and the reaction product is a poly(epsilon-caprolactam).

18. A method of improving the spinning characteristics of a resinous mixture or blend of a polyester in a polyamide which comprises:
   (a) forming a reaction product of a polyester having a melting point of at least 200° C. and a polyamide having a melting point of at least 175° C. to an intrinsic viscosity of from 0.2 to 0.8, and in which at least 15% by weight of the polyester has been reacted with said polyamide, and
   (b) including from 0.5 to 20 parts by weight of such reaction product in each 100 parts of a mixture or blend formed from
     (1) from 25 to 65 parts by weight of a polyester having a melting point of at least 200° C. and an intrinsic viscosity in the range of from 0.6 to 1.2 as one phase, and
     (2) from 75 to 35 parts by weight of polyamide in which the polymer unit contains from 6 to 21 carbon atoms and having a relative viscosity as determined in 98% $H_2SO_4$ of from 2.5 to 3.2 as the other phase.

19. A method in accordance with claim 18 in which the polyester of the reaction product has the same polymer unit as the polyester in the mixture or blend.

20. A method in accordance with claim 19 in which the polyester is a poly(ethylene terephthalate).

21. A method in accordance with claim 18 in which the polyamide of the reaction product has the same polymer unit as the polyamide in the mixture or blend.

22. A method in accordance with claim 21 in which the polyamide is a poly(epsilon-caprolactam).

23. A method in accordance with claim 21 in which the polyamide is a poly(enantholactam).

24. A method in accordance with claim 18 in which the polyester of the reaction product has the same polymer unit as the polyester in the mixture, and the polyamide of the reaction product has the same polymer unit as the polyamide in the mixture.

25. A method in accordance with claim 18 in which the reaction product has an average molecular weight less than the average molecular weight of the individual resinous components of the mixture or blend.

26. A method in accordance with claim 18 in which the intrinsic viscosity of the reaction product is in the range of from 0.3 to 0.6, and at least 25% of the polyester has been reacted with the polyamide.

27. A method in accordance with claim 18 in which the concentration of the polyester in the mixture is above 30 parts by weight per 100 parts of mixture.

28. A method in accordance with claim 18 in which the concentration of the polyester in the mixture is above 30 parts by weight per 100 parts of mixture and the mixture in the absence of the reaction product is normally unspinnable.

29. A textile filament in accordance with claim 7 in which the polyamide in the mixture or blend is poly(hexamethylene adipamide).

30. A method in accordance with claim 18 in which the polyamide of the reaction product is poly(hexamethylene adipamide).

References Cited
FOREIGN PATENTS
132,546   5/1949   Australia.

MURRAY TILLMAN, *Primary Examiner.*

P. LIEBERMAN, *Assistant Examiner.*